United States Patent [19]

Falace et al.

[11] Patent Number: 5,700,125
[45] Date of Patent: Dec. 23, 1997

[54] GRAVITY FEED PASS-THRU PORT FOR AUTOMATED CARTRIDGE LIBRARY

[75] Inventors: Joseph Philip Falace, Louisville; John David Miller, Arvada, both of Colo.

[73] Assignee: Storage Technology Corporation, Louisville, Colo.

[21] Appl. No.: 622,306

[22] Filed: Mar. 27, 1996

[51] Int. Cl.$^6$ ..................................................... B65G 1/06
[52] U.S. Cl. .................. 414/276; 193/44; 198/409; 414/277; 414/786
[58] Field of Search ........................... 414/276–278, 414/280–283, 786; 360/92; 369/35–39; 198/465.1, 408, 409, 803.2; 193/44, 47

[56] References Cited

U.S. PATENT DOCUMENTS

| | | | |
|---|---|---|---|
| 1,854,446 | 4/1932 | Campbell | 198/409 |
| 3,854,605 | 12/1974 | Proper et al. | 414/283 X |
| 3,931,882 | 1/1976 | Ossbahr | 198/803.2 |
| 4,251,177 | 2/1981 | Neuhaeusser et al. | 414/276 |
| 4,608,679 | 8/1986 | Rudy et al. | 369/39 X |
| 4,679,286 | 7/1987 | Momoi et al. | 198/803.2 X |
| 4,800,999 | 1/1989 | Matsuo | 198/408 X |
| 4,981,409 | 1/1991 | Hirose et al. | 414/280 X |
| 5,128,912 | 7/1992 | Hug et al. | 369/35 X |
| 5,139,384 | 8/1992 | Tuttobene | 414/277 X |
| 5,178,506 | 1/1993 | Meschi | 414/281 X |
| 5,336,030 | 8/1994 | Ostwald et al. | 414/277 |
| 5,411,358 | 5/1995 | Garric et al. | 414/277 |
| 5,508,859 | 4/1996 | Hu et al. | 414/276 X |

FOREIGN PATENT DOCUMENTS

| | | | |
|---|---|---|---|
| 4028059 | 3/1992 | Germany | 414/283 |

*Primary Examiner*—David A. Bucci
*Attorney, Agent, or Firm*—Duft, Graziano & Forest, P.C.

[57] ABSTRACT

A pass thru port, for use in an automated cartridge library, is capable of transferring a cartridge from one module of the automated cartridge library to another module of the automated cartridge library without the use of motors or other powered devices. A rotating mechanism, operating under the force of gravity, engages the cartridge after the cartridge is released by the robot arm of the first module. The rotating mechanism turns the cartridge so it faces in the appropriate direction to be received by the second module. A pivoting tray in the second module engages the cartridge as the cartridge slides from the rotating mechanism to the second module. The pivoting tray positions the cartridge in the second module so that it may be retrieved by a robot arm in the second module. Multiple cartridges can be loaded into the pass thru port and removed one at a time from the second module with the next module automatically moving into position in the second module when the first cartridge is removed.

24 Claims, 4 Drawing Sheets

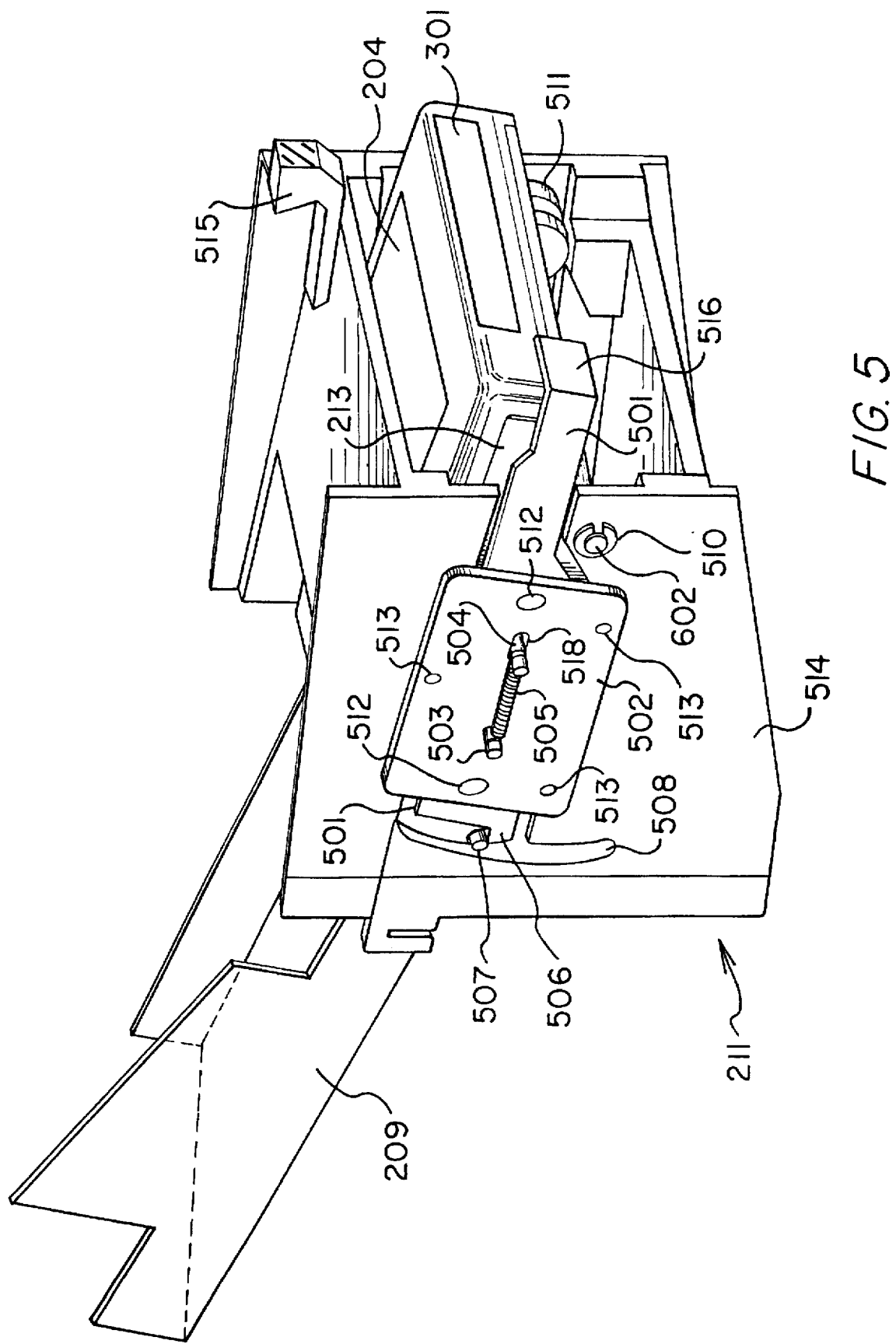

GRAVITY FEED PASS-THRU PORT FOR AUTOMATED CARTRIDGE LIBRARY

FIELD OF THE INVENTION

The invention relates to automated cartridge libraries used to handle large numbers of data storage cartridges and to devices for passing cartridges from one automated cartridge library module to another automated cartridge library module. In particular, the invention relates to a pass through port which operates through the force of gravity and without any hydraulic or motor driven means.

PROBLEM

A popular device for handling large amounts of information in a data processing system is the automated cartridge library. These systems store and manage large numbers of standardized cassettes containing magnetic tape on which is recorded data. Typically an automated cartridge library is comprised of arrays of uniquely identified cells, each cell being formed to contain a single tape cartridge. The cell arrays are racks for holding a multitude of tape cartridges, each tape cartridge having some kind of identifying information, such as a bar code. A robot arm, having an optical system for selecting the correct cartridge is operable within the automated cartridge library to locate a particular cell, retrieve a tape cartridge from the particular cell, convey the tape cartridge to a tape drive, and insert the tape cartridge into the tape drive. The tape drive is then operable to read or write data to the magnetic tape of the tape cartridge. In this way, a large number of tape cartridges are automatically accessible to a single tape drive mechanism. The operation of the automated cartridge library is typically controlled by a host computer communicating with a library control unit associated with the library storage module.

In some applications, such a large amount of data must be stored that it is desirable to employ more than one automated tape library in order to manage the large number of tape cartridges. Rather than repeating an entire automated cartridge system including all the necessary control units, the host computer, and the tape drive, it is desirable to link together multiple library storage modules. Each library storage module contains cell arrays and a robotic arm as described above but does not require additional host computers and need not contain a tape drive. Multiple library storage units are arranged adjacent one another and pass-through ports are provided for passing tape cartridges from one library storage module to an adjacent library storage module. In this arrangement, the host computer can direct a library storage module to pass a tape cartridge to an adjacent library storage module, where it is picked up by the robot arm of the adjacent library storage module and transported to, and inserted in, a tape drive of the adjacent library storage module. This arrangement obviously provides advantages to managers of large amounts of data who are able to simply add additional library storage modules as their need for data storage grows. There are many reasons why one might need to transfer a tape cartridge from one library storage module to another library storage module. One reason is that a certain library storage module might not have a tape drive. However, even when each library storage module has a tape drive associated with it, a need exists, for efficient management of data, to move tape cartridges from one library storage module to another library storage module.

A critical component in the utilization of multiple library storage modules, as described above, is the pass thru port from one library storage module to an adjacent library storage module. The pass thru port must remove a tape cartridge from a first library storage module and convey the tape cartridge to a second library storage module. In the process, the pass thru port must change the orientation of the tape cartridge from that which is suitable for the first library storage module to that which is suitable for the second library storage module. Tape cartridges are typically stored in arrays of cells which hold the cartridge at a slight angle from horizontal so that the force of gravity retains a tape cartridge within a cell when it is deposited there by the robot arm. In addition, the unique identifying information for each tape cartridge, typically a bar code, is affixed to a face of the tape cartridge. The face of the tape cartridge with the identifying information protrudes from a cell when the tape cartridge is stored in the cell. Therefore, the pass thru port must remove a tape cartridge from a first library storage module at a first angle and a first orientation, rotate the tape cartridge to a second orientation and a second angle, as defined by the design and orientation of a second and adjacent library storage module and present the tape cartridge in the second library storage module for handling by the robotic arm of the second library storage module.

To achieve the pass thru port operations described above, prior art pass thru ports have required motors, power amplifiers, electrical cabling, and sensors in order to perform the multiple operations necessary of the pass thru port. Those multiple operations, as described above, include moving a tape cartridge from one library storage module to an adjacent library storage module and changing the orientation of the tape cartridge in both direction and angle. These prior art pass thru ports have been effective for the task but they have suffered from problems of size, complexity, and cost. The motors, power amplifiers, electrical cabling, and sensors required in prior art pass thru ports have resulted in relatively large pass thru ports. This is a problem because the pass thru port takes space away from the primary function of the library storage module, that is storing data. Space is made for the pass thru port in both library storage modules by removing cartridge cells from the cell arrays. A hole is then cut in the wall of each library storage module to allow the pass thru port to mate with the inner portions of both library storage modules. The motors, power amplifiers, electrical cabling, and sensors of the pass thru port require extra space which means additional cartridge cells are eliminated from both library storage modules. This reduces the overall storage capacity of each library storage module. The motors, power amplifiers, electrical cabling, and sensors also increase the complexity of the pass thru port making it more expensive to manufacture initially and more expensive to maintain over the useful life of the library storage module. An additional cost with regard to prior art pass thru ports is the need for a library management unit to interpret and convey commands between a host computer and the library control unit of each library storage module. A library management unit is necessary because signals must be supplied to the motors and sensors of the pass thru port in order to operate the pass thru port.

There exists a need, therefore, for a pass thru port having a low-cost design, being relatively inexpensive to produce and maintain, and being relatively compact so as to minimize the loss of storage capacity in library storage modules in which the pass thru port is used. There is an additional need for a pass thru port that operates reliably without the need for additional motors, sensors, and electrical cabling.

SOLUTION

The present invention solves the above identified problems and others, thereby advancing the state of the useful arts, by providing apparatus and methods for pass thru ports of low-cost, relative simplicity, and relatively small size. In particular, this invention provides a pass thru port which requires no electrical devices such as motors, power amplifiers, electrical cabling, and sensors yet is fully operational in conjunction with the automated tape cartridge library to perform the necessary operations of the pass thru port.

The basic operation of the pass thru port of the present invention takes advantage of the vertical stacking arrangement of the cell arrays in library storage modules. The force of gravity is utilized to move a tape cartridge from a cell in an originating library storage module, rotate the tape cartridge, and deliver the tape cartridge to a cell in a receiving library storage module at the proper angle for pick-up by the robot arm of the receiving library storage module. This operation is initiated by signals from the host computer which cause the action of the robot arm in the originating library storage module and is completed entirely through the operation of the force of gravity. There are no motors, power amplifiers, electrical cabling, or sensors necessary and there are no control signals necessary from a library management unit or other control device in order to operate the pass thru port.

Operation of the pass thru port of the present invention begins with the host computer sending signals to the robot arm of the originating library storage module. These signals cause the robot arm of the originating library storage module presenting a tape cartridge to a designated entry cell in the originating library. The back of the entry cell opens to an entrance chute of the pass thru port. When the robot's gripper releases the tape cartridge, the tape cartridge enters the entry cell and slides into the entrance chute by the force of gravity. A bucket is mounted on the entrance chute and is positioned to receive the tape cartridge as it slides from the entry cell. The bucket is mounted to rotate about a point offset from the center of the bucket and therefore the bucket is eccentrically loaded when the bucket receives the tape cartridge. The bucket pivots against the force of a biasing spring and presents the tape cartridge to an exit chute of the pass thru port. The tape cartridge has now been turned so that the identifying label of the tape cartridge is now facing inward to the receiving library storage unit module. As the bucket pivots, the tape cartridge slides out of the bucket and into the exit chute. The pivoting bucket is returned to its starting position by the force of the biasing spring to receive another tape cartridge. The tape cartridge slides down the exit chute into an exit cell in the adjacent receiving library storage module.

The exit cell consists of a pivoting tray which is initially positioned at a similar angle as the entry cell in order to receive the tape cartridge. When the tape cartridge fully enters the exit cell, a latch is tripped by the tape cartridge causing the pivoting tray to rotate to the proper angle for a storage cell in the receiving library. The exit cell containing the tape cartridge is now positioned at the same angle as all the cells in the cell array of the receiving library storage module. When the robot arm of the receiving library storage module retrieves the tape cartridge, the pivoting tray resets, under the force of a spring, to a position ready to accept another tape cartridge from the pass thru port.

An additional advantage of the exit cell design is that multiple tape cartridges can be stored ready to be received in the exit cell. When one tape cartridge is removed from the exit cell by the robot arm, another of the "stacked" tape cartridges automatically slides from the exit chute and is loaded in the exit cell.

It is obvious to those skilled in the art that the pass thru port of the present invention provides advantages over the prior art. The operation of the pass thru port is accomplished without the use of motors, power amplifiers, electrical cabling, or sensors. In addition, no separate control of the pass thru port is necessary from a host computer or library control unit as the operation of the pass thru port is initiated by the operation of the robot arm in the originating library.

BRIEF DESCRIPTION OF THE DRAWINGS

FIG. 5 depicts a tray assembly as a tape cartridge is entering the tray assembly.

DETAILED DESCRIPTION

Description of Over-all System

Figure 1:
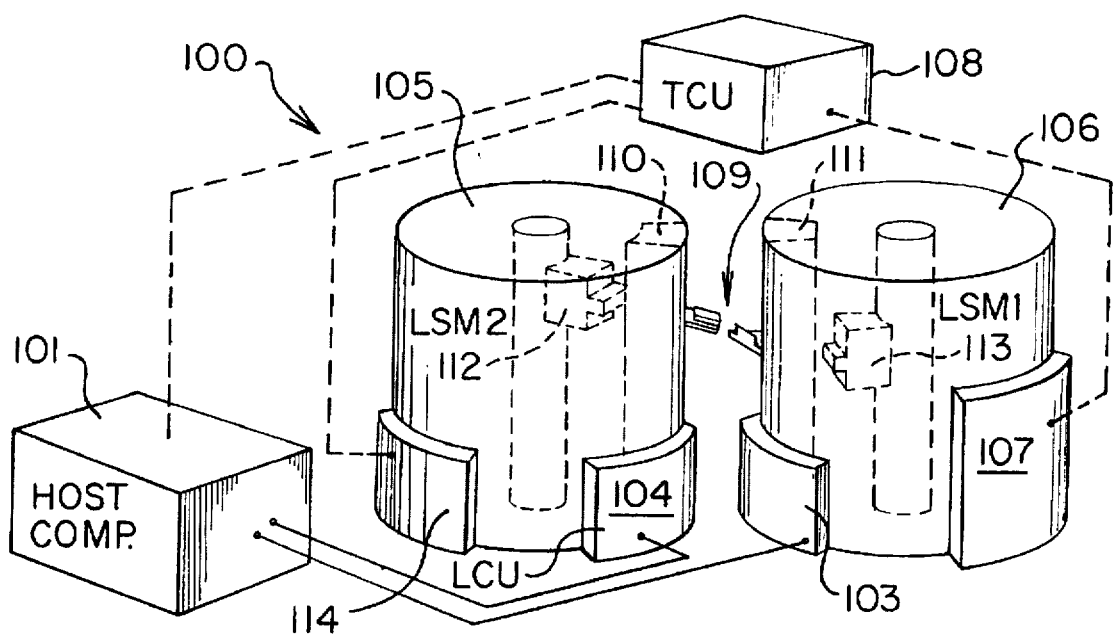
FIG. 1 depicts an automated cartridge library utilizing a pass thru port between two library storage modules.

FIG. 1 depicts an automated cartridge library system 100. Operation of automated cartridge library system 100 is directed by a host computer 101. Host computer 101 communicates with a library control unit (LCU) 104 and a library control unit (LCU) 103. The operation of a robot arm 112 within an originating library storage module (LSM) 105 is governed by library control unit (LCU) 104 which interprets signals from host computer 101 and provides appropriate signals to robot arm 112 to control its motion and operation. The operation of a robot arm 113 within a receiving library storage module (LSM) 106 is governed by a library control unit (LCU) 103 which interprets signals from host computer 101 and provides appropriate signals to robot arm 113 to control its motion and operation. Signals from host computer 101 control the handling and storage of tape cartridges within originating library storage module 105 and receiving library storage module 106. Signals between host computer 101 and library storage modules 105 and 106 are conducted over wires represented by the solid lines in FIG. 1. Data to be written to a tape cartridge (not shown in FIG. 1) or read from a tape cartridge is communicated over wires represented by the dotted lines of FIG. 1 though tape control unit (TCU) 108. TCU 108 controls the operation of tape drive 107 associated with LSM 106 and optional tape drive 114 associated with LSM 105.

In general terms, if there is a need to read data from a tape cartridge in receiving LSM 106, robot arm 113, in response to signals from host computer 101, retrieves the appropriate tape cartridge from a storage cell and inserts the tape cartridge in tape drive 107. Signals from host computer 101 through TCU 108 then control the reading/writing of data from/to the tape cartridge. If, however, there is a need to read data from a tape cartridge stored in originating LSM 105, and optional tape drive 114 is not available, then the following operations occur. Host computer 101 communicates with LCU 104 to cause robot arm 112 of originating LSM 105 to retrieve the subject tape cartridge from its storage cell. Through further signals from host computer 101, robot arm 112 of originating LSM 105 delivers the subject tape cartridge to a designated cell (not shown in FIG.

1) in a cell array 110. The designated cell in cell array 110 allows the subject tape cartridge to enter pass thru port 109 which, by operation as described below, passes the subject tape cartridge to a designated cell in cell array 111 within receiving LSM 106. Host computer 101 next directs robot arm 113 of receiving LSM 106 to retrieve the subject tape cartridge from the cell in cell array 111 in which it was deposited by pass thru port 109. Further signals from host computer 101 direct robot arm 113 of receiving LSM 106 to insert the subject tape cartridge into tape drive 107. Host computer 101 then communicates with TCU 108 which operates tape drive 107 to read the data from the subject tape cartridge requested by host computer 101. Finally, TCU 108 communicates the requested data back to host computer 101.

General Description of Pass-Thru Port Operation

Figure 2:
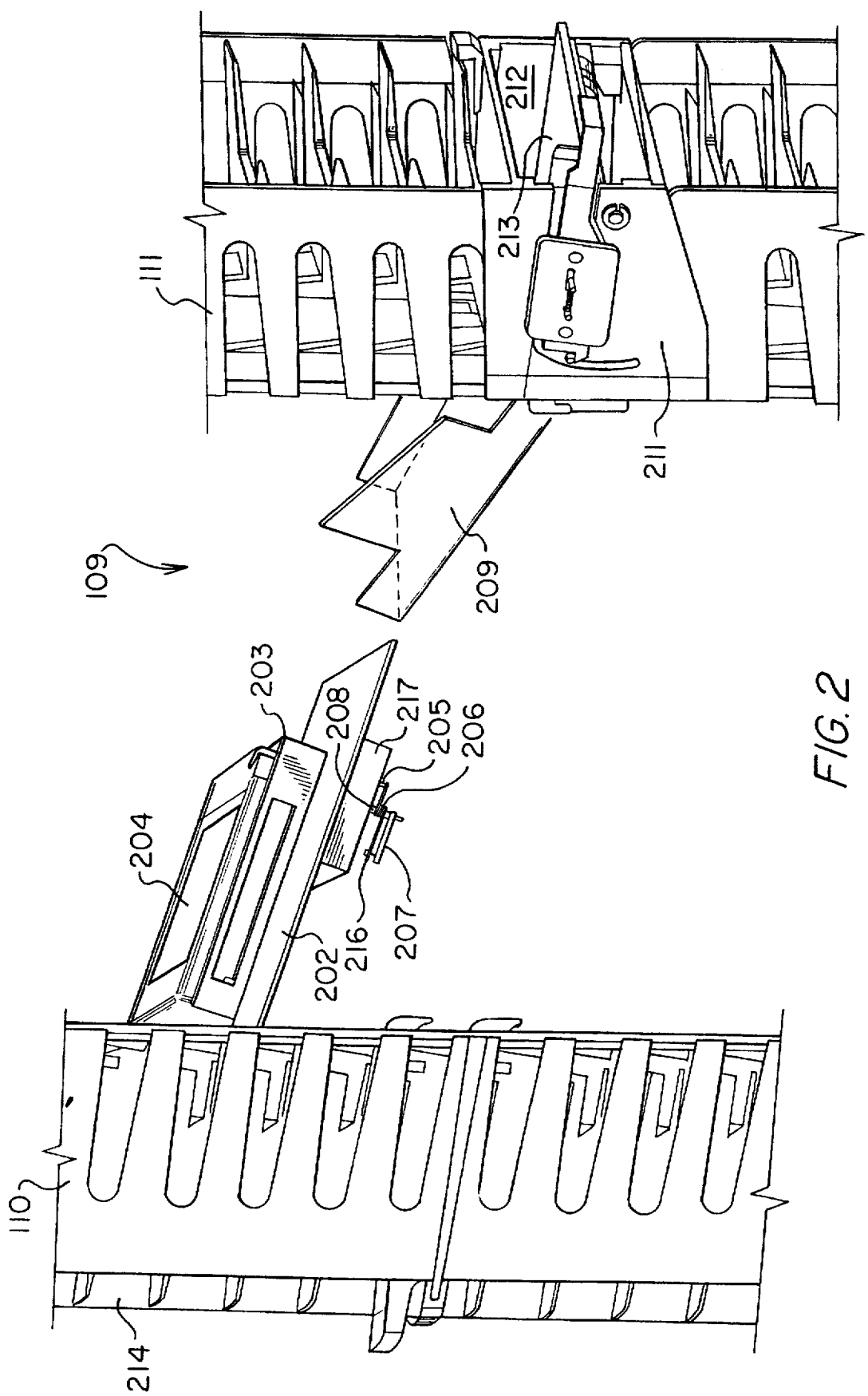
FIG. 2 depicts a pass thru port of the present invention at a first stage of operation.

Referring now to FIG. 2, the pass thru port of the present invention is shown in greater detail. Whereas FIG. 1 depicts the entire automated cartridge library system 100, only cell array 110 of originating LSM 105, and cell array 111 of receiving LSM 105, and the associated hardware of pass thru port 109 are shown in FIG. 2. As described with reference to FIG. 1, host computer 101 directs robot arm 112 in originating LSM 105, through LCU 104, to retrieve a tape cartridge 204 from a cell anywhere within originating LSM 105. Since tape cartridge 204 is to be passed to receiving LSM 106, host computer 101 directs robot arm 112 of originating LSM 105 to present tape cartridge 204 to pass thru cell 214. The optical identification system (not shown) on robot arm 112 indicates to host computer 101 that tape cartridge 204 is ready to deposit in pass thru cell 214. Host computer 101 communicates signals to release the robot grippers (not shown) so that tape cartridge 204 slides into pass thru cell 214. In a preferred embodiment of the present invention, tape cartridge 204 is provided with a "push" by robot arm 112 upon release into pass thru cell 214 in order to ensure that tape cartridge 204 enters pass thru port 109 with enough energy to complete operation of pass thru port 109.

Figure 3:
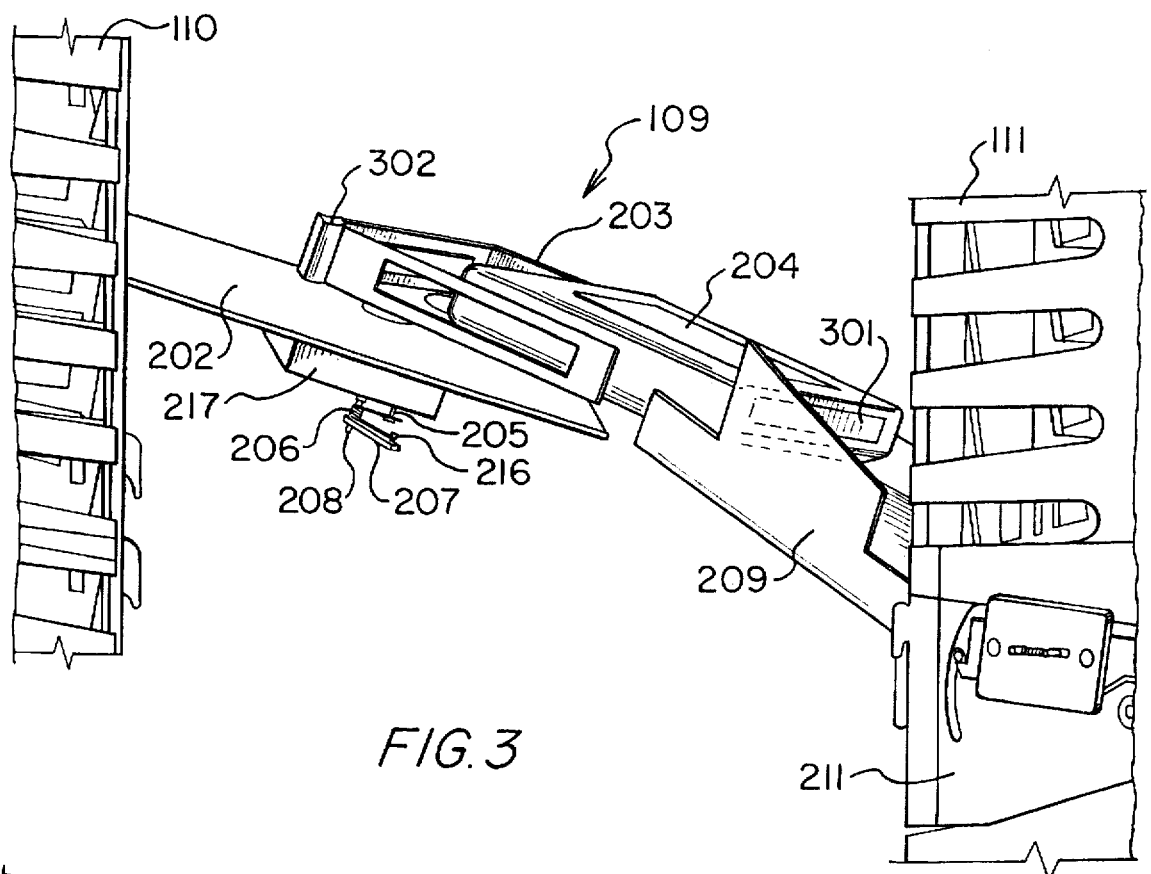
FIG. 3 depicts a pass thru port of the present invention at an intermediate stage of operation.

Unlike the other cells in cell array 110, pass thru cell 214 is open at the back, the side facing pass thru port 109, to allow tape cartridge 204 to slide out of pass thru cell 214 and onto an entrance chute 202. A bucket 203 is rotatably mounted on entrance chute 202 and positioned to accept tape cartridge 204 as it slides from pass thru cell 214 down entrance chute 202. Bucket 203 is comprised of a high wear resistant, low friction material such as Delrin AF manufactured by DuPont. This is the position of tape cartridge 204 in relation to pass thru port 109 shown in FIG. 1. Bucket 203 is connected to entrance chute 202 through shaft 208 about which bucket 203 can rotate. As is best seen in FIG. 3, bucket 203 is mounted eccentrically to shaft 208. In other words, the connection between bucket 203 and entrance chute 202 through shaft 208 is off the center line of bucket 203 so that when tape cartridge 204 is received by bucket 203, bucket 203 rotates, due to the weight of tape cartridge 204, about shaft 208. Rotation of bucket 203 around shaft 208 is limited by stop 302 on entrance chute 202. Stop 302 is positioned on entrance chute 202 so that the open end of bucket 203 is aligned with an exit chute 209 when bucket 203 contacts stop 302. Tape cartridge 204 can then slide from bucket 203 to exit chute 209. An alternative embodiment of the present invention replaces the operation of stop 302 by arranging bucket 203 and exit chute 209 so that the rotation of bucket 203 is stopped by exit chute 209.

Bucket 203's tendency to rotate about shaft 208 must be counteracted when bucket 203 is empty so that bucket 203 is maintained in the proper position to receive cartridges from pass thru cell 214. Bucket 203's tendency to rotate about shaft 208 is counteracted by a torsion spring 206 which is held stationary at one end to spring post 205. The other end of torsion spring 206 rotates with movement of shaft 208 and is held by pin 216 on lever 207. Lever 207 extends radially from shaft 208. The spring constant of torsion spring 206 must be chosen so that bucket 203 is held in the proper position, against a stop (not shown), when empty and waiting to receive tape cartridge 204 from pass thru cell 214. However, spring 206 must also allow bucket 203 to rotate when tape cartridge 204 is received by bucket 203. The spring constant of spring 206 must also take into account a variety of weights for tape cartridge 204 if automated cartridge library 100 utilizes cartridges of various sizes. Bearing block 217 has within it ball bearings (not shown) which communicate with shaft 208 to ensure smooth and repeatable rotation of shaft 208 and bucket 203.

When the weight of tape cartridge 204 causes bucket 203 to rotate around shaft 208, gravity overcomes the static friction between tape cartridge 204 and bucket 203 and tape cartridge 204 slides towards exit chute 209. This is the position of tape cartridge 204 in relation to pass thru port 109 shown in FIG. 3. As can be seen in FIG. 3, tape cartridge 204 slides from bucket 203 into exit chute 209. At this point in its progress through pass thru port 109, tape cartridge 204 has been rotated so that a label 301 bearing identifying information for tape cartridge 204 is facing towards cell array 111. Label 301 on tape cartridge 214 was previously pointed toward robot arm 112 of originating LSM 105. Tape cartridge 204 slides down exit chute 209 of pass thru port 109, under the force of gravity, towards a tray assembly 211. Tape cartridge 204 is accepted by tray assembly 211 and pivoted to achieve the proper angle for cell array 111, all as described below with respect to FIGS. 5 and 6.

Description of Pivoting Tray Operation

Figure 6:
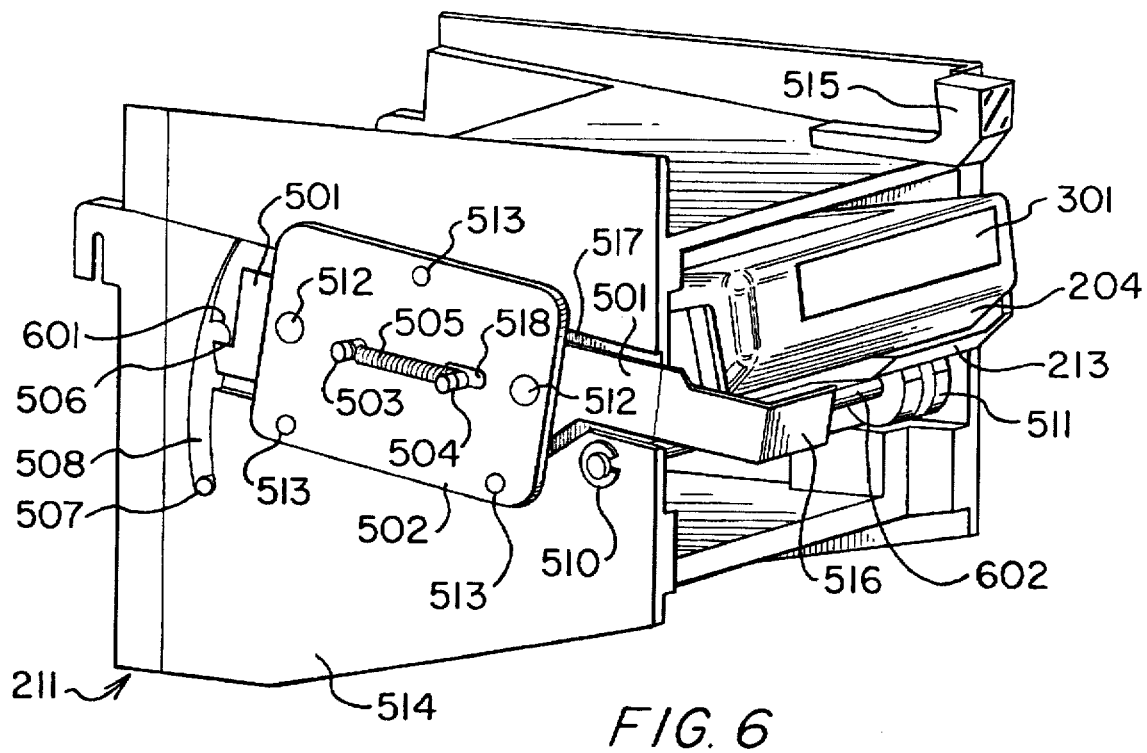
FIG. 6 depicts an tray assembly with a tape cartridge ready to be retrieved by a robot arm of the receiving library.

The operation of pivoting tray assembly 211 is described in more detail with respect to FIGS. 5 and 6. FIGS. 5 and 6 depict tray assembly 211 without the remainder of cell array 111. Tray 213 is pivotally mounted within a tray housing 514 by an axle 602 which passes through a spring housing 511 of tray 213. Tray 213 is made from a high wear resistant material such as Delrin, manufactured by DuPont. A pair of keepers 510 secures axle 602 to tray housing 514. Only one keeper 510 is visible in FIGS. 5 and 6. A target 515 is connected to housing 514 so that the identifying markings on target 515 can be viewed by the vision system on robot arm 113. Tape cartridge 204 slides down exit chute 209 and onto tray 213. A spring (not shown), mounted within spring housing 511, operates to bias tray 213 in the position of tray 213 shown in FIGS. 2 and 5. In this way, tray 213 is biased in a position to accept tape cartridge 204 as tape cartridge 204 slides from exit chute 209.

A lever 501 having a tab 516, a catch 506, and a spring pin 504 is slidably mounted in a groove 517 on the side of housing 514. Lever 501 is held in groove 517 by a plate 502 which is mounted to housing 514 through screws 513. Spring pin 504 of lever 501 is arranged to move within slot 518 of plate 502. Spring pin 504 is biased by a spring 505 which is connected between spring pin 504 and a post 503 mounted on plate 502. Sintered bronze bushings 512 insert through plate 502, contacting lever 501, to ensure a consistently smooth surface against which lever 501 slides. Bushings 512 also encourage proper positioning of lever 501 in groove 517 so that lever 501 is maintained in the proper position relative to tape cartridge 204 as tape cartridge 204 enters tray 213.

The operation of tray assembly 211 begins with tray 213 in the position shown in FIG. 2 and 5 ready to a receive a tape cartridge 204 from exit chute 209. The spring of spring housing 511 biases an empty tray 213 in the position shown in FIG. 2. Tray 213 is held in this position by post 507 of tray 2506 of lever 501. Levey catch 506 of lever 501. Lever 501 is biased by spring 505 such that post 507 of tray 213 rests on catch 506. When tape cartridge 204 slides from exit chute 209, it slides onto tray 213. Tape cartridge 204 continues to slide down tray 213 until it contacts lever tab 516 of lever 501. Post 507 and catch 506 prevent tray 213 from pivoting until cartridge 204 is fully engaged in tray 213. The momentum of tape cartridge 204 sliding down tray 213 is converted to a force acting on lever tab 516. The force acting on lever tab 516 overcomes the bias of spring 505 and pushes lever 501 forward in the direction of movement of tape cartridge 204 thereby pulling catch 506 from underneath post 507. With tray 213 supported only by axle 602, the weight of tape cartridge 204 causes tray 213 to pivot around axle 602, allowing post 507 of tray 213 to travel downward in a guide 508. Tray 213 continues to rotate around axle 602 until post 507 reaches the bottom of guide 508 and tray 213 is in the position shown in FIG. 6. Post 507 is now at the bottom extreme of travel possible within guide 508. Tape cartridge 204 is now at the same angle as the cells in cell array 111 and is in position to be retrieved by robot arm 113 of receiving LSM 106.

Figure 4:
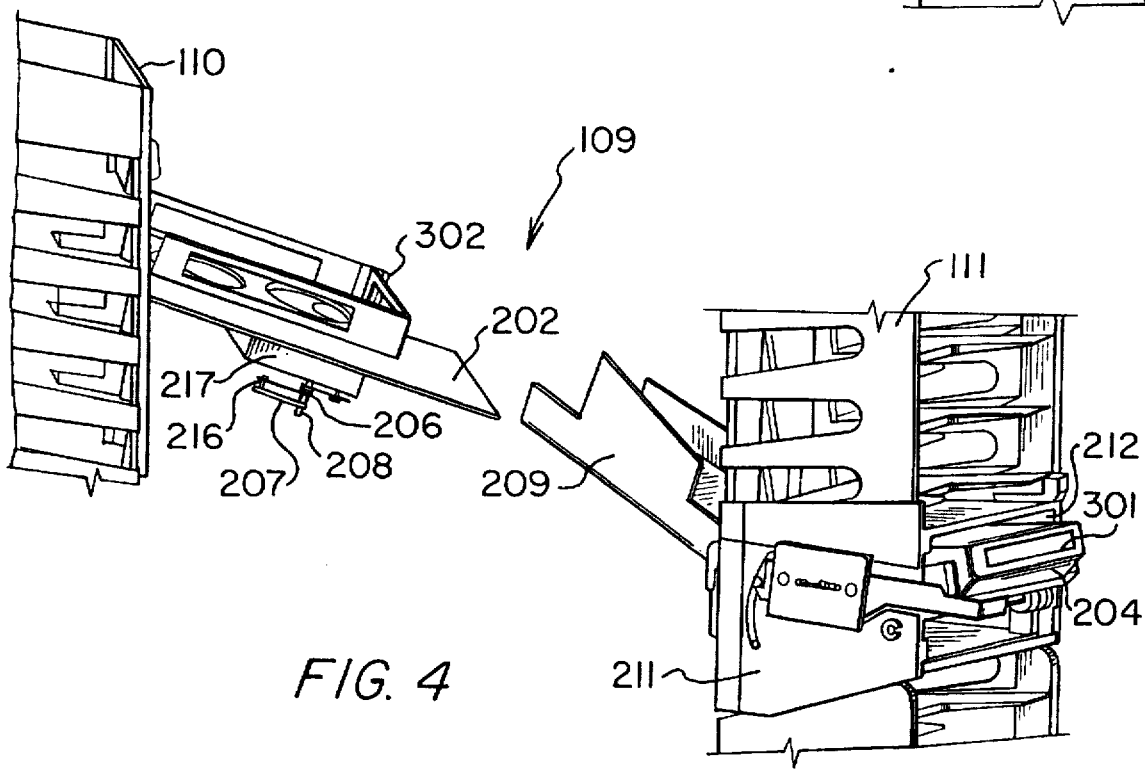
FIG. 4 depicts a pass thru port of the present invention at a final stage of operation.

FIG. 4 depicts the final position of tape cartridge 204 within tray assembly 211. Tape cartridge 204 is now retrieved from tray 213 within tray assembly 211 by robot arm 113 of receiving LSM 106, in response to signals communicated from host computer 101. Tape cartridge 204 is then inserted in tape drive 107 by robot arm 113 of receiving LSM 106. Also note, in FIG. 4, that bucket 112 returns to its original position, shown in FIG. 2, under the force of torsion spring 206, after tape cartridge 204 slides from bucket 203 into exit chute 209. In this way, pass thru port 109 is automatically reset to receive a second tape cartridge 204 as soon as the first tape cartridge 204 slides from bucket 203.

As tray 213 pivots under the weight of tape cartridge 204, tape cartridge 204 no longer exerts any force on lever tab 516 and therefore spring 505 returns lever 501 to its starting position. Tray 213 remains in the position shown in FIG. 6 until tape cartridge 204 is retrieved by robot arm 113 of receiving LSM 106. When that occurs, the weight of tape cartridge 204 is no longer available to overcome the force of the spring of spring housing 511 which therefore causes tray 213 to begin to pivot around axle 602 to return to its starting position. The spring of spring housing 511 is strong enough to cause post 507 to push catch 506 forward slightly as post 507 slides upward in guide 508. The upward motion of post 507, and therefore tray 213, is limited by stop 601. Post 507 pushes catch 506 slightly forward as it moves into position against stop 601. When post 507 has passed catch 506, spring 505 causes catch 506 to pull back into position below post 507. Tray 213 is once again in the position shown in FIG. 2 and 5 and is ready to receive another tape cartridge 204 from exit chute 209.

To provide complete interchangeability between two library storage modules, two pass thru ports, one arranged to conduct a tape cartridge 204 from LSM 105 to LSM 106, and the other arranged to conduct a tape cartridge 204 from LSM 106 to LSM 105, are required. It is obvious to one skilled in the art to adapt the pass thru port described herein to conduct tape cartridge 204 from LSM 106 to LSM 105.

It is to be expressly understood that the claimed invention is not to be limited to the description of the preferred embodiment but encompasses other modifications and alterations within the scope and spirit of the inventive concept.

I claim:
1. A pass thru port for transferring a cartridge, using only the effect of gravitational force, from an originating storage module wherein said cartridge resides at a first orientation and a first angle to a receiving storage module wherein said cartridge resides at a second orientation and a second angle, comprising:

conveying means for conveying said cartridge from said originating storage module to a rotating means, said rotating means operable to turn said cartridge from said first orientation to said second orientation and deliver said cartridge to a pivoting means, said pivoting means operable for receiving said cartridge from said rotating means and pivoting said cartridge from said first angle to said second angle.

2. The apparatus of claim 1 wherein said conveying means is comprised of a chute connected at an upper end to a cell in said originating storage module and operable to receive a cartridge inserted into said cell from said originating storage module for delivery to said rotating means.

3. The apparatus of claim 1 wherein said rotating means comprises:

a bucket rotatably mounted to said conveying means, and aligned to receive said cartridge from said conveying means, said bucket being operable to receive said cartridge at a first position and rotate to a second position to deliver said cartridge to said pivoting means.

4. The apparatus of claim 3 wherein said bucket is mounted to said conveying means through a shaft connected to said conveying means and inserted eccentrically through said bucket.

5. The apparatus of claim 4 wherein said rotating means further comprises:

a biasing means to hold bucket in said first position until said biasing means is overcome by the weight of said cartridge in said bucket.

6. The apparatus of claim 1 wherein said pivoting means further comprises:

a housing, a tray for receiving said cartridge from said rotating means, said tray mounted within said housing so as to pivot about its point of connection to said housing an actuation means, responsive to receipt of said cartridge in said tray, for causing said tray to move from said first angle to said second angle within said housing.

7. Apparatus as in claim 6 wherein said actuation means further comprises:

a latch slidably connected to said housing and responsive to receipt of said cartridge in said tray for releasing said tray from a catch whereby said tray pivots under the weight of said cartridge from said first angle to said second angle.

8. The apparatus of claim 7 wherein said actuation means further comprises:

tray biasing means to position said tray at said first angle when said cartridge is removed from said tray.

9. An automated tape library having two storage modules each containing a polygonal array of cartridge storage cells, comprising:

a cartridge storage cell in said first storage module for receiving a cartridge, pass thru means connected to said storage modules and using only the effect of gravitational force for changing the orientation of said cartridge from a first orientation to a second orientation, pivoting means in said second storage module and using only the effect of gravitational force for receiving said cartridge at a first angle and positioning said cartridge at a second angle.

10. The apparatus of claim 9 wherein said pass thru means comprises:

a bucket rotatably mounted and aligned to receive said cartridge from said first storage module and to deliver to said second storage module.

11. The apparatus of claim 9 wherein said pivoting means comprises:

a housing arranged within said polygonal array of said second storage module, a tray pivotally connected to said housing and positioned for receiving said cartridge from said pass thru means, an actuation means, response to receipt of said cartridge in said tray, for causing said tray to move from said first angle to said second angle.

12. The apparatus of claim 11 wherein said actuation means comprises:

a latch slidably connected to said housing and responsive to receipt of said cartridge in said tray for releasing said tray from a catch whereby said tray pivots under the weight of said cartridge from said first angle to said angle.

13. The apparatus of claim 12 wherein said actuation means further comprises:

tray biasing means to position said tray at said first angle when said cartridge is removed from said tray.

14. In a pass thru port for transferring a cartridge, using only the effect of gravitational force, from an originating storage module wherein said cartridge resides at a first orientation and a first angle to a receiving storage module wherein said cartridge resides at a second orientation and a second angle, a method comprising the steps of:

conveying said cartridge from said originating storage module to a rotating means rotating said cartridge in said rotating means from said first orientation to said second orientation to deliver said cartridge to a pivoting means; and pivoting said cartridge from said first angle to said second angle.

15. The method of claim 14 wherein said step of conveying comprises:

connecting a chute at an upper end to a cell in said originating storage module; and receiving a cartridge inserted into said cell from said originating storage module for delivery to said rotating means.

16. The method of claim 14 wherein said step of rotating said cartridge further comprises the step of:

biasing said rotating means at a first position until said cartridge is received by said rotating means; and rotating said rotating means to a second position to deliver said cartridge to said pivoting means.

17. The method of claim 14 wherein said step of pivoting further comprises the step of:

receiving said cartridge from said rotating means to a tray, causing said tray to pivot from a first angle to a second angle.

18. The method of claim 17 wherein said step of causing said tray to pivot further comprises the steps of:

contacting a latch with said cartridge when said cartridge is received in said tray whereby said tray is caused to pivot under the weight of said cartridge from said first angle to said second angle.

19. The method of claim 17 wherein the step of causing said tray to pivot further comprises the step of:

biasing said tray to said to first angle when said cartridge is removed from said tray.

20. In a method for operating an automated tape library having two storage modules each containing a polygonal array of cartridge storage cells, the method comprising the steps of:

inserting a cartridge in a storage cell in said first storage module for receiving said cartridge, changing the orientation of said cartridge from a first orientation to a second orientation using only the effect of gravitational force, pivoting said cartridge from a first angle to a second angle using only the effect of gravitational force.

21. The method of claim 20 wherein the step of changing the orientation of said cartridge further comprises the steps of:

rotating a bucket aligned to receive said cartridge from said first storage module to a position to deliver said cartridge to said second storage module.

22. The method of claim 20 wherein said step of pivoting further comprises the steps of:

receiving said cartridge from said rotating means to a tray, causing said tray to pivot from a first angle to a second angle.

23. The method of claim 22 wherein said step of causing said tray to pivot further comprises the steps of:

contacting a latch with said cartridge when said cartridge is received in said tray whereby said tray is caused to pivot under the weight of said cartridge from said first angle to said second angle.

24. The method of claim 23 wherein the step of causing said tray to pivot further comprises the step of:

biasing said tray to said first angle when said cartridge is removed from said tray.

* * * * *